United States Patent [19]

Franks et al.

[11] 4,255,300

[45] Mar. 10, 1981

[54] COMPOSITION AND PROCESS FOR MAKING PRECIPITATED CELLULOSE-POLYVINYL ALCOHOL BICONSTITUENT COMPOSITION

[75] Inventors: Neal E. Franks, Suffern, N.Y.; Julianna K. Varga, Asheville, N.C.

[73] Assignee: Akzona Incorporated, Asheville, N.C.

[21] Appl. No.: 54,355

[22] Filed: Jul. 2, 1979

Related U.S. Application Data

[63] Continuation-in-part of Ser. No. 938,907, Sep. 1, 1978, Pat. No. 4,196,282, which is a continuation-in-part of Ser. No. 854,957, Nov. 25, 1977, Pat. No. 4,145,532.

[51] Int. Cl.$^3$ .............................................. C08L 1/02
[52] U.S. Cl. ..................... 260/17.4 CL; 260/29.6 R; 260/29.6 AQ; 260/29.6 NR; 260/29.6 WA; 536/56; 536/57
[58] Field of Search ................... 260/30.4 R, 17.4 CL

[56] References Cited

U.S. PATENT DOCUMENTS

| | | | |
|---|---|---|---|
| 2,179,181 | 11/1939 | Graenacher et al. | 106/163 R |
| 2,744,292 | 5/1956 | Schlosser et al. | 106/165 |
| 3,382,185 | 5/1968 | Wheeler et al. | 260/30.4 N |
| 3,447,939 | 6/1969 | Johnson | 536/43 |
| 3,508,941 | 4/1970 | Johnson | 106/162 |
| 3,758,457 | 9/1973 | Broeck | 536/56 |
| 4,118,350 | 10/1978 | Turbak et al. | 260/15 |
| 4,145,532 | 3/1979 | Franks et al. | 106/176 |

OTHER PUBLICATIONS

Chem. Absts., vol. 154,860q, "Dissolution of Cellulose in Organic Solvents in the Presence of Small Amounts of Amines and Sulfur Dioxide", Yamazaki et al.

*Primary Examiner*—Edward M. Woodberry
*Attorney, Agent, or Firm*—Francis W. Young; Jack H. Hall; H. Walter Haeussler

[57] ABSTRACT

A composition and process are provided for making precipitated biconstituent cellulose-polyvinyl alcohol shaped articles by dissolving polyvinyl alcohol and cellulose in a tertiary amine oxide solvent containing from about 0.8 to about 29% water to form a biconstituent dispersion wherein the cellulose and polyvinyl alcohol comprise distinct phases, preferably with the two solutions codispersed within each other. Shaped articles can be formed from the biconstituent dispersions of the invention.

16 Claims, No Drawings

COMPOSITION AND PROCESS FOR MAKING PRECIPITATED CELLULOSE-POLYVINYL ALCOHOL BICONSTITUENT COMPOSITION

CROSS REFERENCE TO RELATED APPLICATIONS

This application is a continuation-in-part of application Ser. No. 938,907 filed Sept. 1, 1978, now U.S. Pat. No. 4,196,282 issued Apr. 1, 1980, which in turn is a continuation-in-part of application Ser. No. 854,957, filed Nov. 25, 1977, now U.S. Pat. No. 4,145,532, issued Mar. 20, 1979.

BACKGROUND OF THE INVENTION

A process for dissolving cellulose, polyvinyl alcohol, or other materials having strong intermolecular hydrogen bonding in a tertiary amine oxide is disclosed by Johnson in U.S. Pat. No. 3,447,939. A cyclic mono(N-methylamine N-oxide) compound such as N-methylmorpholine N-oxide is used as the solvent. The solution can be used in chemical reactions involving the dissolved polymer or to precipitate the polymer to form a film or filament. The resulting solutions, insofar as the actual examples of the patent indicate, have significant disadvantages because they are of low solids content and have a high viscosity.

In accordance with the process disclosed in U.S. Pat. No. 3,508,941, two or more different polymers are dissolved in a cyclic mono(N-methylamine N-oxide) compound and are precipitated together to produce a bicomponent polymer mixture. A diluent such as dimethyl sulfoxide, N-methylpyrrolidone or sulfolane may be added to the solution as a diluent to reduce its viscosity. The solutions also have the same deficiencies noted for the first mentioned patent.

U.S. Pat. No. 4,145,532, and copending application Ser. No. 938,907, filed Sept. 1, 1978, to the inventors herein, disclose cellulose solutions and precipitated cellulose articles formed from a tertiary amine oxide solvent containing up to about 29% water.

DESCRIPTION OF THE INVENTION

A composition and process are provided for making precipitated biconstituent cellulose-polyvinyl alcohol shaped articles by dissolving polyvinyl alcohol and cellulose in a tertiary amine oxide solvent containing from about 0.8 to about 29% water to form a biconstituent dispersion wherein the cellulose and the polyvinyl alcohol comprise distinct separate phases. In a preferred embodiment the two solutions are codispersed within each other. Shaped articles can be formed from the biconstituent dispersions of the invention, wherein in the presently preferred embodiment the article contains two continuous phases codispersed within each other.

The cellulose solutions which are used in the process of the invention are formed by the process described in U.S. Pat. No. 4,145,532 and copending application Ser. No. 938,907, filed Sept. 1, 1978, both of which are hereby incorporated by reference. The amount of cellulose dissolved in the solution may be varied up to about 44% by weight of solution.

While a number of researchers have attempted to define the class of amine oxides that can be used as a solvent for cellulose, none of the definitions are satisfactory, based on Applicants' results. Applicants postulate, without being bound by their theory, that the amine oxides of the invention, with one exception to be noted later, contain some type of cyclic structure where the amine function can be either exo to the ring or endo, i.e., a part of the ring. In the former case, an N,N-dimethylamine function creates the structure necessary to provide solvency whereas in the latter case, a single methyl radical on the nitrogen atom is required for solvency. Furthermore, the molecule must have a high dipole moment of say at least about 4.5 Debyes. It has been observed that pyridine N-oxide, having a dipole moment of 4.2 Debyes will not dissolve cellulose.

The dissolution of cellulose by certain amine oxides appears to require a molecular structure having the polar end provided by the N-O dipole and a hydrophobic end able to slide into the space between the cellulose chains.

The interaction between the N-O dipole and the cellulose hydroxyl groups serves to disrupt the hydrogen bonded portion of the cellulose structure, much as the N-O dipole is known to interact with other alcohols or water.

With an exception to be noted later, the interaction between amine oxides and cellulose seems to require a cyclic structure to achieve solution. It is necessary to consider some postulated structures for the cellulose microfibril to rationalize this requirement. The simplest description that helps achieve this end is the structure put forward by J. O. Warwicker and A. C. Wright, J. Appl. Poly. Sci., 11, 659 (1967), a simplified version of which is shown in FIG. 2 of U.S. Pat. No. 4,145,532 in which the dimension c is the length of an anhydroglucose unit of the cellulose molecule, i.e., the distance between the hemiacetal oxygens in the cellulose chain. By referring to this structure, it is possible to distinguish the modes of action of the amine oxide between the relatively polar hydrogen bonded region 5 and the hydrophobic region 3 existing in the plane of the anhydroglucose residues (FIG. 1 of U.S. Pat. No. 4,145,532). The relative dimensions of the hydrophobic ring portion of the amine oxide molecule and the hydrophobic portion of the cellulose microstructure appear significant. It appears to be the case that the width of the ring structure, in order to "fit" within the space 3 between the adjacent chains of cellulose molecules, must be smaller than the length of the anhydroglucose unit c, that is, less than about 5.15 Å.

The following amine oxides have the necessary ring structure and dimensions and have been found to exhibit the solvency for cellulose contemplated by the invention:

N-methylhomopiperidine oxide
N-methylmorpholine oxide
N,N-dimethylcyclohexylamine oxide
N,N-dimethylbenzylamine oxide The foregoing amine oxides may be represented by one of the following formulae:

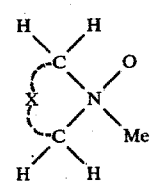 (a)

wherein X is a radical chain completing a ring comprising 2 to 4 carbon atoms; and

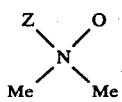

(b)

wherein Me is methyl and Z is (i) an aromatic or saturated or unsaturated 5-, 6- or 7-membered ring, unsubstituted or substituted only by methyl in positions where the resulting ring width is less than about 5.15 A or (ii) $CH_2CH_2W$ where W can be OH, SH or $NH_2$.

However, substitution of a diethylamino group for the dimethylamino groups results in an inoperative composition, due, in our opinion, to the masking of the dipole moment of the amine oxide end. Similarly, substitution of other groups results in a molecule in which the indicated dimension of the ring is greater than 5.15 A which, it is hypothesized, will not fit into the hydrophobic portion of the cellulose molecule.

Several solvents coming within the invention that do not meet the cyclic requirements for the hydrophobic end can be explained on the basis of a "pseudo-ring" structure. For instance, N,N-dimethylethanolamine N-oxide can be represented by a ring structure which may explain its ability to dissolve cellulose as follows:

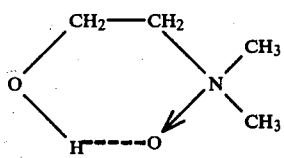

This molecule meets the spatial requirements postulated for the ring dimension to fit into the hydrophobic portion of the cellulose molecule. Moreover, it has been observed that N,N-dimethylamino-2-propanol N-oxide will not dissolve cellulose under the conditions of this invention and this observation would seem to lend support to the "pseudo-cyclic" structure proposed above in view of the larger dimension of the ring portion, i.e., greater than 5.15 A, as follows:

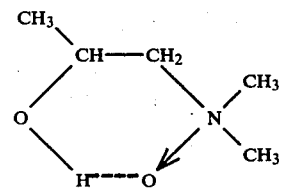

When these two compounds are viewed in the pseudo-cyclic representation, there is a close similarity to the N-methylmorpholine oxide series in which 2,6-dimethyl-N-methylmorpholine oxide is not an effective solvent for cellulose, although N-methylmorpholine oxide is.

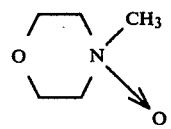

N-methylmorpholine oxide

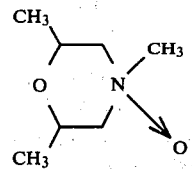

2,6-Dimethyl-N-methylmorpholine oxide

Another solvent, although marginal in its ability to dissolve cellulose, which can be explained by the pseudocyclic structure, is 2(2-hydroxypropoxy)-N-ethyl-N,N-dimethylamine N-oxide. The psuedocyclic structure proposed for this compound is:

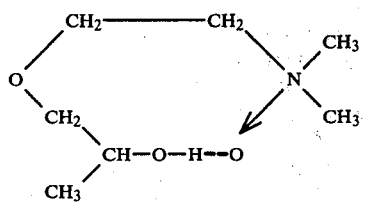

An exception to the cyclic structure proposed, mentioned previously, is triethylamine oxide.

However, this amine oxide is an effective solvent for cellulose (in the presence of the critical amount of water, from 7–29% by weight of cellulose), notwithstanding reported observations to the contrary. The reported observations of the inability of this amine oxide to act as a solvent is believed to be due to a rearrangement, or conversion, at the recovery temperatures used (90°–95° C.) and low water content, of at least part of the triethylamine oxide to diethylhydroxylamine oxide, which latter is not a cellulose solvent. However, applicants were able to successfully dissolve cellulose with triethylamine oxide, containing about 7–29% water by preparing the triethylamine oxide by adding 35% aqueous hydrogen peroxide to a mixture of triethylamine, methanol and an inorganic catalyst and removing the methanol and part of the water under vacuum and moderate temperature (60°–65° C.).

Tertiary amine oxides which may be used to advantage when mixed with water in practicing the invention include N,N-dimethylethanolamine oxide, N,N-dimethylbenzylamine oxide, triethylamine oxide, N,N-dimethylcyclohexylamine oxide, N-methylmorpholine oxide, N-methylhomopiperdine oxide and 2(2-hydroxypropoxy)-N,N-dimethyl-N-ethylamine N-oxide.

As pointed out above, the percentage range of water required in the solvent will vary with the tertiary amine oxide in the solvent.

However, using as a solvent N-methylmorpholine N-oxide with up to about 22% by weight water a solution containing up to 38% by weight cellulose based on total solution can be achieved; with N,N-dimethylethanolamine N-oxide as solvent containing from up to about 12.5% by weight water the solution will contain up to 31% by weight cellulose; with N,N-dimethylbenzylamine N-oxide as solvent containing from about 5.5% to about 17% by weight water the solution will contain from about 1% to about 20% cellulose; with N,N-dimethylcyclohexylamine N-oxide as solvent containing up to about 21% by weight water the solution will contain up to about 44% by weight cellulose; with N-methylhomopiperidine N-oxide as solvent containing from about 5.5% to about 20% by weight water the solution will contain from about 1% to about 22% by weight cellulose; with 2(2-hydroxypropoxy)-N-ethyl-N,N-dimethylamine N-oxide as solvent containing from about 5% to about 10% by weight water the solution will contain from about 2% to about 7.5% by weight cellulose; with N-methylpiperidine N-oxide as solvent containing up to about 17.5% by weight water the solution will contain from about 5% to about 17.5% cellulose; with N,N,N-triethylamine N-oxide as solvent containing from about 7% to about 29% by weight water the solution will contain from about 5% to about 15% by weight cellulose. However, the lower limit will not be obtained by ordinary method of removing water from the N,N,N-triethylamine oxide, since decomposition begins to take place below about 11% water.

Preferred tertiary amine oxides which may be used in practicing this invention include N-methylmorpholine N-oxide, N,N-dimethylethanolamine N-oxide and N,N-dimethylcyclohexylamine N-oxide.

The polyvinyl alcohol which can be employed in the compositions of this invention include virtually any polyvinyl alcohol, which is substantially hydrolysed. For example any commercially available uncrosslinked polyvinyl alcohol from the low viscosity types to the high viscosity types may be employed.

Polyvinyl alcohol solutions can be prepared in the presence of the above identified amine oxides in concentrations up to about 40% by weight or more in the presence of a solubility enhancing amount of water above about 5% by weight, preferably between about 6% and about 13% by weight of the solution. The maximum amount of polyvinyl alcohol which can be dissolved depends upon the particular amine oxide and the amount of water present.

The biconstituent cellulose-polyvinyl alcohol dispersions of the invention can be formed in a multiplicity of ways. The dispersion can be formed by codissolving the cellulose and polyvinyl alcohol in an amine oxide solvent containing an amount of water which enhances the solubility of both the cellulose and polyvinyl alcohol; two separate polymer-amine oxide-water solutions can be prepared which are then blended; or a cellulose-amine oxide solution containing an amount of water which enhances the solubility of both the cellulose and polyvinyl alcohol and then the polyvinyl alcohol polymer added thereto.

In any of the above processes, the biconstituent solution of the invention are formed at a temperature above the precipitation or solidification point of any component in the solution and below the decomposition point of the dispersion or a component thereof. Preferably the dispersions are formed and maintained at a temperature below about 135° C. and preferably below about 130° C., temperatures above which the commencement of decomposition has been noted.

The biconstituent dispersions formed in the process of the invention are dispersions which comprise the polyvinyl alcohol and cellulose in distinct separate phases. Preferably, the two solutions are codispersed within each other.

The ratio of cellulose to polyvinyl alcohol in the dispersions of the invention can vary widely, for example, from about 1:99 to about 99:1 and preferably from about 5:95 to about 95:5.

The total solids content of the dispersions is usually below the 40% and preferably between about 1% and about 30%.

It has been found that the higher the dispersion temperature and the higher the solids content the more solution coloration can be expected.

It has further been found that biconstituent dispersions containing about 7% to about 10% water are particularly useful for forming relatively strong films. The final films appear to display their maximum strength when the dispersions contain about 7 to about 11% moisture.

Additionally, excellent dispersion fiber elongation is achieved when the cellulose:PVA ratio is between about 4:1 to about 2:1, especially when the total solids are below about 20%.

If desired, a mixture of amine oxides can be employed in the dispersions of the invention, and when appropriate in the formation process, can be used to form any of the precursor solutions.

If desired, a non-reactive organic cosolvent may be used in quantities up to, for example, about 25% by weight of the total dispersion, and may be employed in quantities up to about, for example 25% by weight of any precursor solution, as a less expensive diluent for the amine oxide, or to lower the viscosity of the solution.

The polyvinyl-alcohol cellulose biconstituent dispersions of the invention are adapted for shaped article production such as by extrusion or spinning followed by coagulation in a non-solvent, for example, methanol to remove the solvent from shaped films or filaments having a biconstituent polymer composition preferably comprising two continuous phases codispersed within each other.

It is noted that the amine oxides contemplated by the invention are sometimes referred to as amine oxides. They are more properly termed "tertiary amine N-oxides".

There follow examples of the invention which are considered illustrative rather than limiting. All parts and percentages are by weight unless otherwise specified. All temperatures are degrees Centigrade. Water determinations on the final compositions were made using a C-Aqua-tester, (Cat. No. 04-10-000, C. W. Brabender Instruments Co., S. Hackensack, N.J.).

EXAMPLE 1

Solutions of polyvinyl alcohol in N-methylmorpholine N-oxide containing various percentages of water were attempted. The results are summarized in Table 1.

TABLE 1

| PVA concentration % | Water concentration % | Temp. °C. | Dissolution Time Minutes | Remarks |
|---|---|---|---|---|
| 10 | 0 | 180 | 8–10 | No solution decomposed |
| 10 | 2 | 160 | 8–10 | Partial solution some decomposition |
| 10 | 6 | 130 | 8–10 | Light colored low visc. soln. |
| 10 | 8 | 125 | 8–10 | Light colored low visc. soln. |
| 10 | 10 | 120 | 8–10 | Light colored low visc. soln. |
| 10 | 12 | 115 | 8–10 | Slightly gel-like soln. |
| 20 | 6 | 120–125 | 20–25 | Medium viscosity |

TABLE 1-continued

| PVA concentration % | Water concentration % | Temp. °C. | Dissolution Time Minutes | Remarks |
|---|---|---|---|---|
| 25 | 6 | 125 | 20–25 | light colored soln. High viscosity |
| 30 | 6 | 130 | 25–30 | light colored soln. High viscosity |
| 40 | 7.8 | 85 | 25–30 | light colored soln. Very high viscosity gel-like soln. |

PVA was found soluble in other amine oxide-water mixtures for example:

10% PVA dissolved in N,N-dimethylethanolamine N-oxide containing 7% water at 145° C. to yield a light colored medium-viscosity solution. However 20% PVA did not dissolve in the same solvent at temperatures up to 160° C. Dissolution of up to 15% PVA in the solvent mixture was possible.

Likewise, up to 30% PVA could be dissolved in a N,N-dimethylcyclohexylamine N-oxide-water mixture. Up to 10% PVA could be dissolved in a N,N-dimethylisopropanolamine N-oxide-water mixture.

EXAMPLE 2

Mixtures of polyvinyl alcohol and cellulose were dissolved in N-methylmorpholine N-oxide-water mixtures in an open container in a glycol heating bath. All the components were added to the container and heated. The results are summarized in Table 2.

TABLE 2

| PVA concentration % | Cell Con. % | Water Con. % | Dissolution Temp. °C. | Time Min. | Remarks |
|---|---|---|---|---|---|
| 20 | 10 | 7.6 | 125 | 25 | Dark amber colored high viscosity soln. |
| 20 | 10 | 5.8 | 85 | 35 | Dark amber colored high viscosity soln. |
| 20 | 10 | 9.5 | 85 | 35 | Light amber colored high viscosity soln. |
| 20 | 10 | 10.0 | 85 | 30 | Light amber colored high viscosity soln. |
| 20 | 10 | 13.0 | 85 | 60 | Some undissolved fiber |
| 10 | 5 | 13.0 | 85 | 30 | Low viscosity light gel particles present |
| 5 | 10 | 7.8 | 105 | 25 | Medium viscosity light colored soln. |
| 5 | 10 | 10.0 | 105 | 25 | Medium viscosity light colored soln. |
| 5 | 10 | 13.0 | 105 | 25 | Medium viscosity light colored soln. |
| 5 | 15 | 10.0 | 105 | 25 | Higher viscosity, amber colored soln. |

It was noted by microscopic examination that all blends appeared to be immiscible and showed indications of decomposition above about 135° C.

The biconstituent blends of medium to low viscosity could be stretched very well.

Because of the solubility of PVA in water, the solutions were precipitated and washed with methanol to remove the amine oxide. After drying the washed materials, no weight loss occurred when articles were immersed in cold water for 24 to 78 hours.

A washed fiber or film when dried at room temperature and having regained a 7–8% moisture content appeared hard and tough. The materials when dried to 0% moisture were brittle.

EXAMPLE 3

10% PVA and 5% cellulose dissolved at 110° C. in N,N-dimethylethanolamine N-oxide (DMEA-O) containing 8.5% water to form a highly viscous, light colored solution. Other PVA-cellulose-DMEA-O solutions prepared are summarized in Table 3.

TABLE 3

| Cellulose concentration % | PVA concentration % | Water % | Temp. °C. | Dissolution Time Minutes | Remarks |
|---|---|---|---|---|---|
| 4.7 | 4.8 | 8.8 | 125–130 | 5–6 | Light color decomposed 145–150° C. |
| 4.7 | 9.6 | 8.5 | 125–130 | 5–6 | Light color decomposed 145° C. |
| 9.4 | 4.8 | 8.6 | 130 | 5–6 | Slightly dark decomposed 135–140° C. |

EXAMPLE 4

PVA-cellulose blends were prepared in N,N-dimethylcyclohexylamine N-oxide water mixtures as summarized in Table 4.

TABLE 4

| Cellulose concentration % | PVA concentration % | Water % | Temp. °C. | Dissolution Time Minutes | Remarks |
|---|---|---|---|---|---|
| 18.8 | 4.8 | 8.9 | 125 | 6–8 | Amber colored solution |
| 9.4 | 9.6 | 9.0 | 120 | 6–8 | Amber colored solution |
| 4.7 | 19.2 | 8.6 | 125 | 6–8 | Amber colored solution |

The above solutions decomposed at 130° C.

Fibers drawn from the solutions and washed with methanol were of medium strength.

EXAMPLE 5

PVA-cellulose blends were prepared in N-methylmorpholine N-oxide/water mixtures as summarized in Table 5.

TABLE 5

| | PVA-CELLULOSE BLENDS IN NMMO/WATER | | | | | | | | | |
|---|---|---|---|---|---|---|---|---|---|---|
| | Starting Composition | | | | Dissolution | | Remarks | | | |
| | | | | | Time | | | Remelt | | Analysis |
| Experiment No. | Cellulose % | PVA % | Water % | Solids | Temp. °C. | Min. | Color | Temp. °C. | Decomp. | Solids % | Water % |
| 1 | 9.4 | 20 | 7.6 | 29.4 | 125 | 25 | dark | room temp. | 135° C. | — | 7.4 |
| 2 | 10.1 | 10 | 13.8 | 20.1 | 90 | 5 | amber | — | 130° C. | — | — |
| 3 | 6.8 | 13.3 | 16.3 | 20.1 | 100 | 5 | amber | 100 | — | — | — |
| 4 | 9.4 | 10 | 7.0 | 19.4 | 105 | 6–8 | dark | — | — | — | 7.9 |
| 5 | 6.7 | 13.3 | 7.0 | 20.0 | 105 | 10 | dark | 85–90 | 130° C. | — | 7.2 |

TABLE 5-continued

PVA-CELLULOSE BLENDS IN NMMO/WATER

| | Starting Composition | | | | Dissolution | | | Remarks | | | |
|---|---|---|---|---|---|---|---|---|---|---|---|
| | | | | | Time | | | Remelt | | Analysis | |
| Experiment No. | Cellulose % | PVA % | Water % | Solids | Temp. °C. | Min. | Color | Temp. °C. | Decomp. | Solids % | Water % |
| 6 | 4.7 | 10.0 | 6.7 | 14.7 | 85–90 | 30 | light | 85–90 | — | — | 7.2 |
| 7 | 9.4 | 20.0 | 5.8 | 29.4 | 85–90 | 35 | dark | 105 | — | — | 5.6 |
| 8 | 9.4 | 20.0 | 9.6 | 2.94 | 85–90 | 35 | amber | 105 | — | 30.24 | 7.7 |
| 9 | 10.1 | 20.3 | 7.7 | 30.4 | 85 | 25 | dark | 105 | 135–140 | 31.9 | 7.2 |
| 10 | 10.0 | 20.0 | 10.0 | 30.0 | 85 | 30 | amber | 135 | 140 | — | 9.2 |
| 11 | 10.0 | 20.0 | 13.0 | 30.0 | 85 | 60 | light | 135 | 145 | — | 13.4 |
| 12 | 4.7 | 10.0 | 13.3 | 14.7 | 85 | 30 | light | 100 | 135 | — | 13.3 |
| 13 | 9.4 | 4.8 | 7.8 | 14.2 | 105 | 25 | light | 105 | 135 | 14.9 | 8.2 |
| 14 | 10.0 | 5.0 | 10.0 | 15.0 | 105 | 25 | light | 105 | 135 | 15.0 | 10.0 |
| 15 | 10.0 | 5.0 | 13.0 | 15.0 | 105 | 25 | light | 105 | 135 | 15.1 | 13.2 |
| 16 | 15.0 | 5.0 | 10.0 | 20.0 | 105 | 25 | amber | 105 | 135 | 20.2 | 10.4 |
| 17 | 10.0 | 2.5 | 10.0 | 12.5 | 105 | 25 | light | — | — | — | — |

Additional examples of polyvinyl alcohol-amine oxide-water solutions and their uses are disclosed in concurrently filed application Ser. No. 54,359, filed July 2, 1979, entitled "Composition and Process For Making Precipitated Nylon-Polyvinyl Alcohol Biconstituent Composition" by the inventors herein, which application is hereby incorporated by reference.

It is noted that amine oxides are hygroscopic and thus tend to pick up water from the air at normal temperatures or up to a certain temperature, above which, they tend to release water vapor. The solution procedure and the water measurement procedure thus have some bearing on the amount of water initially employed and subsequently measured.

While the invention is described in detail above, it is understood that variation can be made by those skilled in the art without departing from the scope of the invention.

What is claimed is:

1. A biconstituent dispersion comprising:
   (A) a first distinct phase comprising a solution of
      (1) cellulose
      (2) a tertiary amine oxide cellulose solvent
      (3) a cellulose solubility enhancing amount of water
   (B) a second distinct phase comprising a solution of
      (1) polyvinyl alcohol
      (2) a tertiary amine oxide polyvinyl alcohol solvent
      (3) a polyvinyl alcohol solubility enhancing amount of water,
   said dispersion containing 0.8 to 29% water, and having the cellulose and polyvinyl alcohol present in a ratio of from about 1:99 to about 99:1.

2. The dispersion as in claim 1 where the amine oxide is N-methylmorpholine-N-oxide.

3. The dispersion as in claim 1 where the amine oxide is N,N-dimethylcyclohexylamine-N-oxide.

4. The dispersion as in claims 1, 2 or 3 where the dispersion contains more cellulose than polyvinyl alcohol.

5. The dispersion as in claims 1, 2 or 3 where the dispersion contains more polyvinyl alcohol than cellulose.

6. A process for forming a biconstituent dispersion of cellulose and polyvinyl alcohol adapted for use in forming shaped biconstituent polymer articles which comprises:
   (A) separately forming a cellulose solution comprising:
      (1) cellulose
      (2) a tertiary amine oxide cellulose solvent
      (3) a cellulose solubility enhancing amount up to about 29% by weight of water,
   (B) separately forming a polyvinyl alcohol solution comprising:
      (1) polyvinyl alcohol
      (2) a tertiary oxide polyvinyl alcohol solvent
      (3) a polyvinyl alcohol solubility enhancing amount above about 5% by weight of water
   (C) admixing said separately formed solutions at a temperature adapted to maintain the cellulose and polyvinyl alcohol in solution to provide a biconstituent dispersion containing 0.8 to 29% water and containing cellulose and polyvinyl alcohol in a ratio of from about 1:99 to about 99:1.

7. The process as in claim 6, wherein the polyvinyl alcohol solution is added to the cellulose solution.

8. The process as in claims 6 or 7 wherein the amine oxide employed in (a) and the amine oxide employed in (b) are the same.

9. The process for forming a biconstituent dispersion of a cellulose and polyvinyl alcohol adapted for use in forming shaped biconstituent polymer articles which comprises:
   (A) forming a cellulose solution comprising:
      (1) cellulose
      (2) a tertiary amine oxide cellulose solvent, and
      (3) a cellulose and polyvinyl alcohol solubility enhancing amount of water,
   (B) adding and dissolving therein polyvinyl alcohol thereby forming a biconstituent dispersion containing up to 29% water and containing cellulose and polyvinylalcohol in a ratio of from about 1:99 to about 99:1.

10. A process for forming a biconstituent dispersion of a cellulose and polyvinyl alcohol adapted for use in forming shaped biconstituent polymer articles which comprises heating a mixture of:
   (a) cellulose
   (b) polyvinyl alcohol
   (c) a tertiary amine oxide cellulose and polyvinyl alcohol solvent
   (d) a cellulose and polyvinyl alcohol solubility enhancing amount of water between about 5% and about 29% by weight of the composition to form a biconstituent dispersion containing cellulose and polyvinyl alcohol in a ratio of from about 1:99 to about 99:1.

11. A process for precipitating a polyvinyl alcohol-cellulose biconstituent article which comprises shaping the dispersion of claims 1, 2, or 3 and separating biconstituent polymer article from the tertiary amine oxide by coagulation in a non-solvent.

12. The dispersion of claims 1, 2 or 3 containing about 7% to about 10% water.

13. The dispersion of claim 12 wherein the ratio of cellulose to polyvinyl alcohol is between about 4:1 and about 2:1.

14. The dispersion of claims 1, 2 or 3 wherein the ratio of cellulose to polyvinyl alcohol is between about 5:95 and about 95:5.

15. A polyvinyl alcohol solution comprising:
    (a) polyvinyl alcohol
    (b) a tertiary amine oxide selected from the group consisting of N,N-dimethylethanolamine N-oxide, 2(2-hydroxypropoxy)-N-ethyl-N,N-dimethylamine N-oxide, triethylamine oxide and a cyclic N-oxide corresponding to the formulae

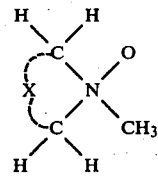

wherein X is a radical chain completing a ring comprising 2 to 4 carbon atoms, or

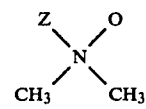

where Z is (i) an aromatic or saturated or unsaturated 5-, 6-, or 7-membered ring, unsubstituted or substituted only by methyl in positions where the resulting ring width is less than about 5:15A or $CH_2CH_2W$ where W can be OH, SH or $NH_2$; and
    (C) a polyvinyl alcohol solubility enhancing amount of water above about 5% by weight of the composition.

16. The polyvinyl alcohol solution, as in claim 15 where the tertiary amine oxide corresponds to formula I or formula II(i).

* * * * *